Dec. 15, 1925.
E. JOSEPHY
1,566,018
REGISTERING DEVICE
Filed April 29, 1921   3 Sheets-Sheet 3
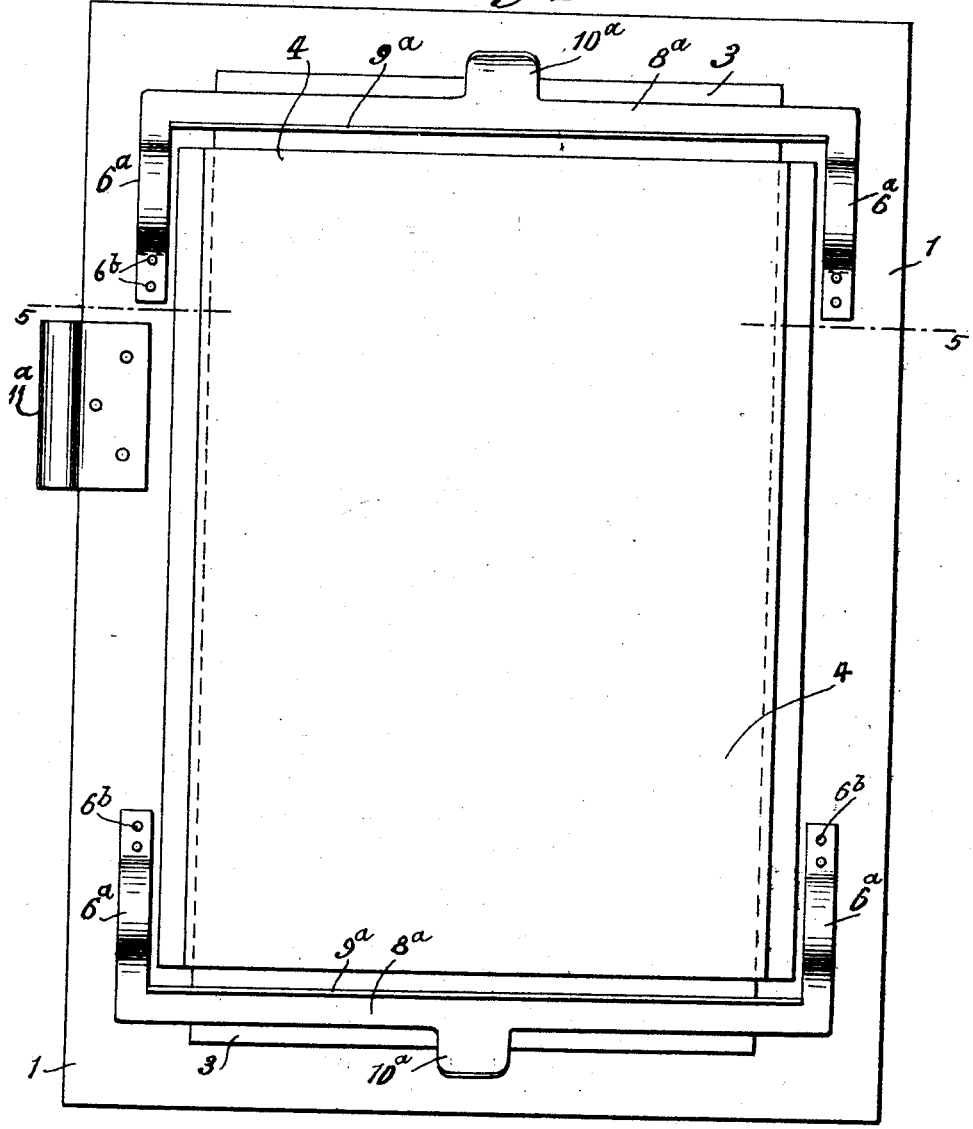

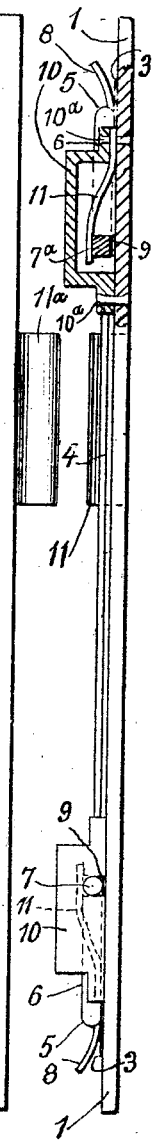

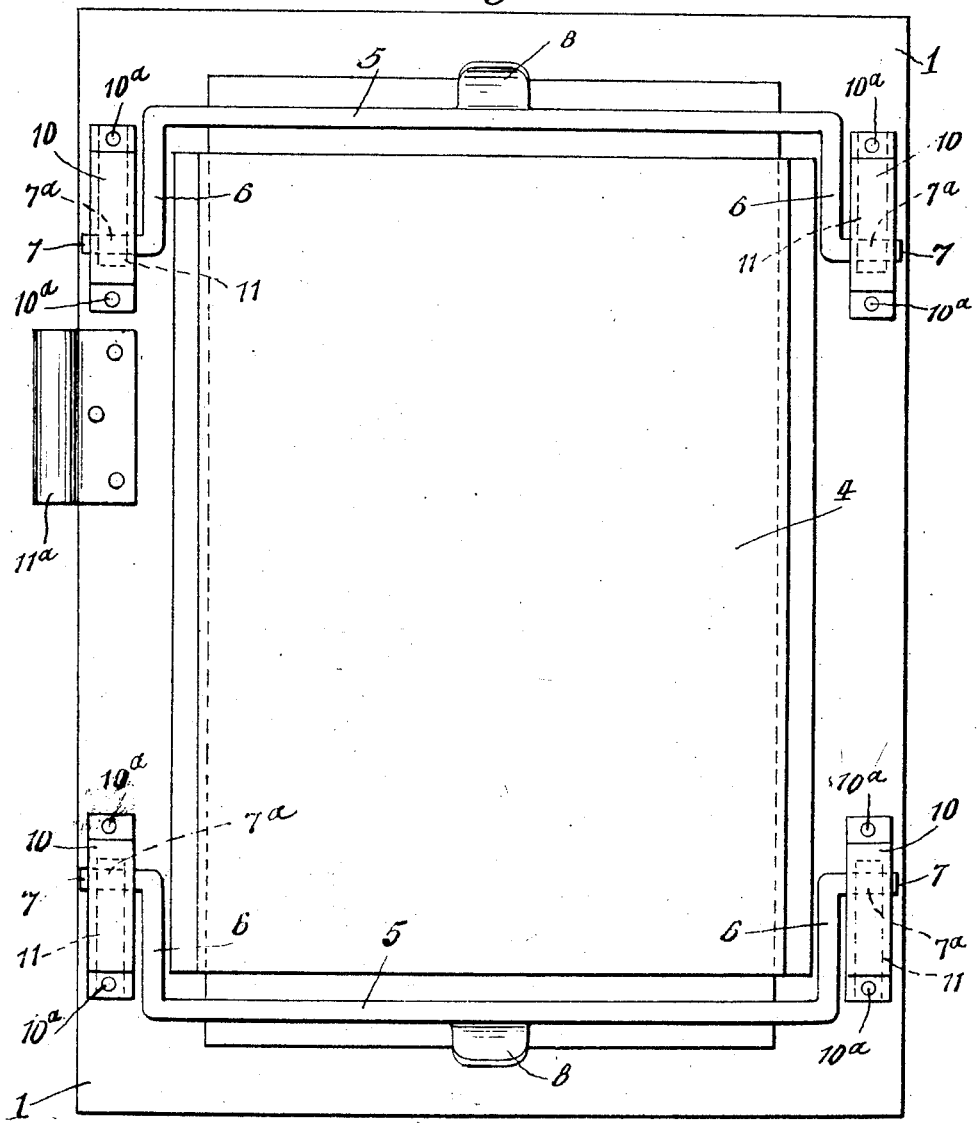

Patented Dec. 15, 1925.

1,566,013

UNITED STATES PATENT OFFICE.

ERWIN JOSEPHY, OF NEW YORK, N. Y.

REGISTERING DEVICE.

Application filed April 29, 1921. Serial No. 465,385.

*To all whom it may concern:*

Be it known that I, ERWIN JOSEPHY, a citizen of the United States, and resident of New York, in the county of New York and State of New York, have invented certain new and useful Improvements in Registering Devices, of which the following is a specification.

This invention relates to registering devices, having reference particularly to a device for registering orders for service of meals in public places, as hotel dining rooms, dining cars of railway trains, restaurants, etc.

When ordering a meal from a waiter under present systems of selecting items from a menu card, patrons either place an order orally or write on a slip of paper a list of dishes desired and pass it to a waiter for execution. Under this system mistakes are frequently made, disputes between patron and waiter arise and patrons are subjected to considerable inconvenience.

My invention has for its principal object the provision of means whereby such liability of mistakes and resultant disputes are obviated.

A further object of the invention is to facilitate the process of recording and placing an order, whereby the patron may exactly register his desires by employment of slight manual and mental effort.

A still further object of the invention is to provide exact records of all transactions between patrons and waiters for the purpose of keeping the management of the establishment constantly informed as to income and the number and variety of food items disposed of, such data materially assisting their calculations for the purpose of maintaining a well balanced food supply and facilitating bookkeeping methods.

These and other objects are attained by employing individual printed sheets of inexpensive paper constituting respectively, a combined menu and a bill, a holder for said sheets, and means for detachably fixing said sheets, within said holder, said sheets respectively having spaced columns for receiving markings constituting an order for food items and a bill for same, as hereinafter fully described and specifically set forth in the appended claim.

In the accompanying drawings forming part of this specification, Figure 1 is a plan or face view of a device illustrating an embodiment of my improvements:

Fig. 2 is an edge view, shown partly in section;

Fig. 3 is a back view;

Fig. 4 is a back view illustrating a slightly modified construction; and

Fig. 5 is a cross sectional view taken on the line 5—5 of Fig. 4.

In the drawings, 1 indicates a frame of rectilinear contour and having an ample opening 2 for exposing the surface of a menu sheet 3, of novel character, as hereinafter described. Extended over the back of the opening 2 of the frame 1 is a plate 4, said plate spaced from said frame sufficiently to provide end slots or opening 5', through which the menu 3 may be introduced and removed.

As a means for retaining the sheet 3 within the device, when the same is in use, I fix to the back of the frame 1, swinging clamps comprising respectively a cross bar 5, extensions 6, bearing members 7 and a thumb piece 8.

The bearing members 7 of the said swinging clamps are journaled through slots 9 of hollow boxes 10, which are fixed to the back of the plate 1 by means of rivets 10ª, said boxes adapted to bear on a table surface when the device is in use. As a means for maintaining the clamps in frictional contact with the sheet 3, I employ plate springs 11 which, at their respective free ends, bear on squared parts 7ª of the bearing members 7, as clearly shown in Fig. 2 of the drawings. When inserting a sheet 3 the clamps are swung over on the back 4 and held in place by the springs 11.

At one side of the frame 1 is fixed a cylindrical pencil holder 11ª, for the purpose of placing a pencil at the handy disposal of a patron using the device.

In the modification of my invention illustrated by Figs. 4 and 5, as the same is in use, I fix to the back of the frame 1, by means of rivets 6ᵇ, spring-clips comprising respectively semielliptical resilient members 6ª, and a cross bar 8ª, constituting a clamping member and having a flange 9ª and a thumb piece 10ª.

The spring members 6ª maintain the cross bar 8ª normally in frictional contact with the back of the frame 1 and parallel with the plane thereof, whereby the end of the menu sheet 3 adjacent thereto is securely clamped and held in place. The flanges 9ª, constitute means for imparting rigidity to the clamping members 8ª and also act as supporting members for the device, said members adapted to bear on a table surface when the device is in use, as shown in Fig. 5 of the drawings, whereby the springs 6ª of the clamping members are not liable to accidental disarrangement and the weight of the device is sustained by said flanges 9ª.

The menu sheets 3 respectively have marked off spaces 12, 13 and 14 to be filled in by the waiter with data comprising his identification number, the table number and the date of the transaction. The sheet 3 is further provided with a ruled column of horizontal spaces 15 containing a printed list of articles of diet on sale, each space registering on the left with a space 16 for receiving a check mark, and on the right with a space 17 whereon notations relative to quantity may be indicated. A column of aligned spaces 18 for containing specific written directions is located at the right of the column 17, and a column 19 having a printed list of prices of the several food items is placed to the right thereof; on the extreme right of the sheet is a parallel column of blank spaces 20, for containing notations constituting an enumeration of specific amounts of charges to be computed in the bill.

In the operation and use of the invention, a waiter adjusts a menu sheet 3 within the holder 1 and places the device before a patron, face up, as shown by Fig. 1 of the drawings. The patron then selects items of diet desired and places a check mark, as X, in the space 16 to the left of each indicated article ordered, he also makes numerical notations in the column 17 indicating the number of portions desired, and if he has any special directions they may be set down in the column 18. The waiter then writes his identification number in the space 12, the table number in the space 13 and the date of the transaction in the space 14; after which the sheet is passed to the chef for the purpose of having the order filled. Having filled and served the order the waiter carries the sheet to the cashier who enumerates the items and computes the amount of the bill in the column 20, whereupon it is handed back to the patron for collection.

It is manifest that by employing this system of taking an order which is placed directly on an individual menu sheet and marked by the patron himself liability of mistakes by the waiter in the transmission of orders is obviated; and further, the system provides correct data for use of the establishment for purposes of maintaining exact records.

In the embodiment of my improvements illustrated particularly by Figures 1 and 2 of the drawings, I have shown a preferred construction of holder and a fair example of a combined menu and bill, filled out by a patron and computed by the cashier, but I do not confine myself to the specific arrangement of recording elements therein shown, as under the spirit of my invention and the scope of the appended claim I believe that I am entitled to the employment of a wide range of variations as to the matter contained on the sheet and the specific details of mere mechanical construction of the holder. I also reserve the right to use my improvement for purposes other than the transmission of orders for food products.

Having thus described my invention, what I claim as new and desire to secure by Letters Patent, is:

A frame for holding register sheets and the like comprising a face member provided with an opening therethrough, a back secured to the rear of said face member, said back having open ends and closed sides, a clamping bar having its ends hingedly secured to said face member, said bar projecting beyond the open end of said back to engage a menu and hold it against the rear of the face member, and spring means secured to said face member and said bar ends to press the bar against the menu as aforesaid.

Signed at New York city in the county of New York and State of New York this 4th day of April A. D. 1921.

ERWIN JOSEPHY.